Feb. 21, 1956 E. F. HUDDLE 2,735,253
TRACTOR-IMPLEMENT COUPLING ARRANGEMENT FOR A HARVESTER
Filed March 17, 1952 2 Sheets-Sheet 1
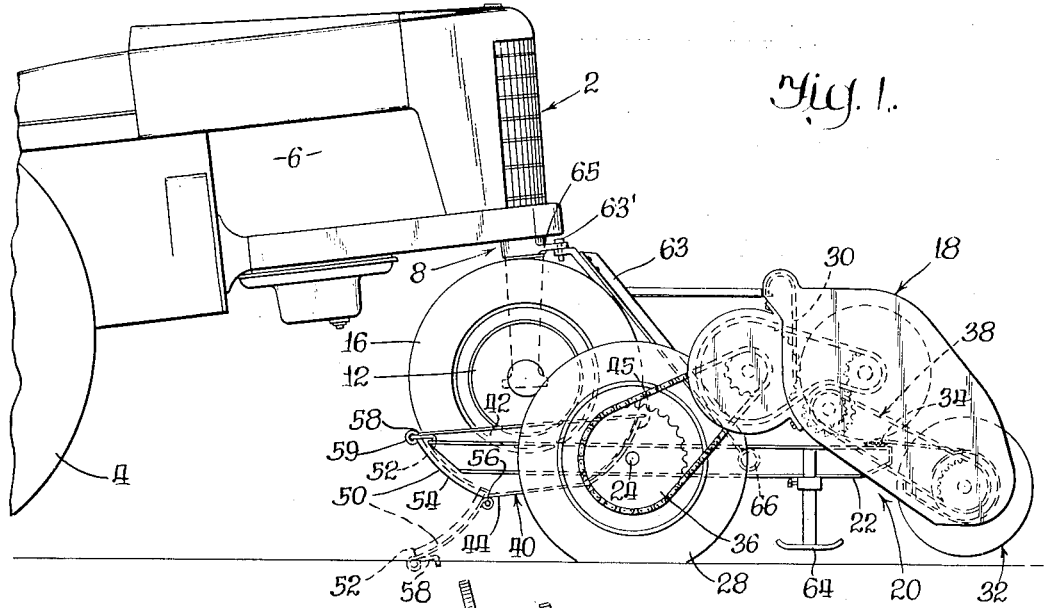
INVENTOR.
Edwin F. Huddle
BY Paul O. Pippel
Atty.

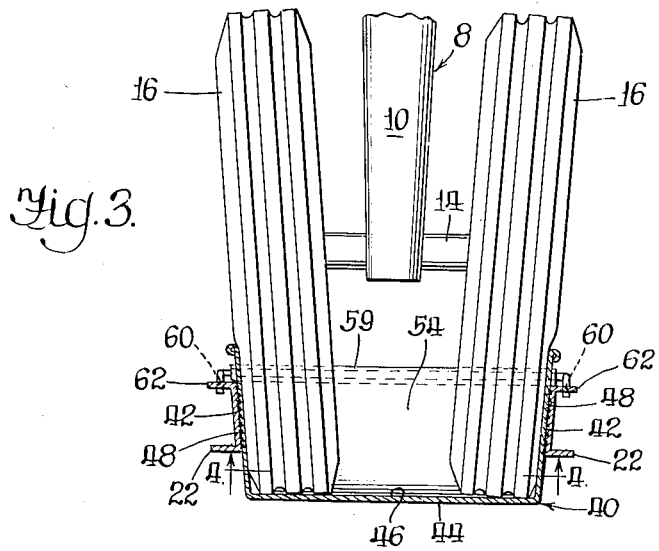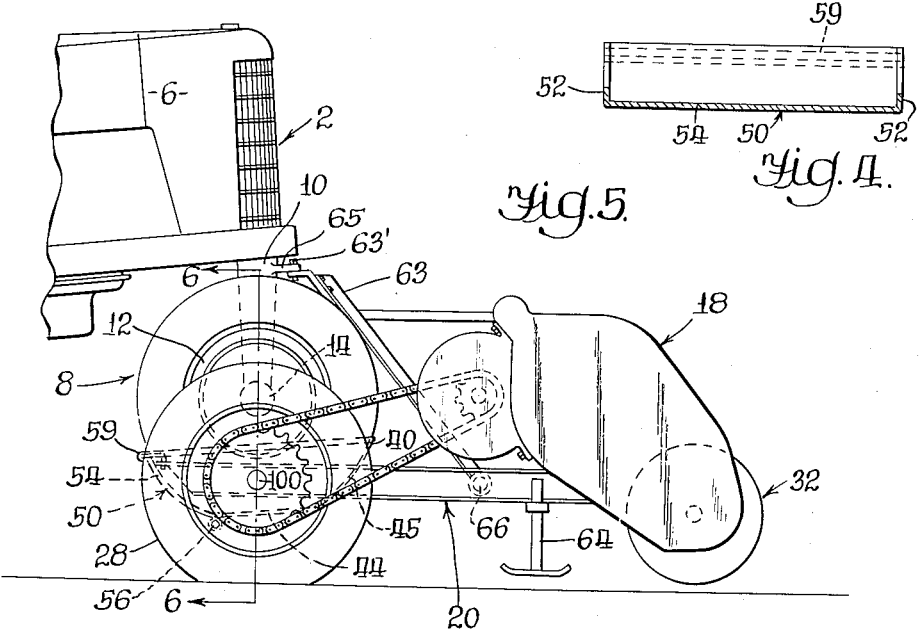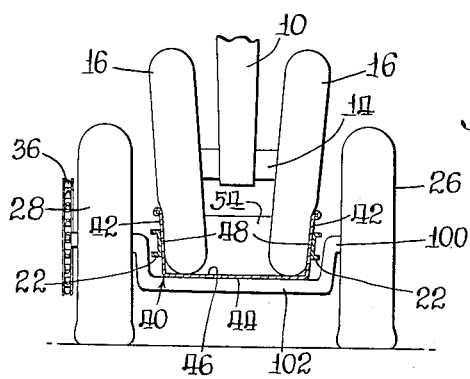

United States Patent Office 2,735,253
Patented Feb. 21, 1956

2,735,253

TRACTOR-IMPLEMENT COUPLING ARRANGEMENT FOR A HARVESTER

Edwin F. Huddle, Elmwood Park, Ill., assignor to International Harvester Company, a corporation of New Jersey Application March 17, 1952, Serial No. 277,033

4 Claims. (Cl. 56—27)

This invention relates to a coupling arrangement between a tractor and a farm implement.

A general object of the invention is to provide a novel coupling which provides an interlock between the steering wheel assembly of the tractor and a wheeled implement such that the forward end of the tractor is supported by the implement off the ground and steered by steering the implement through the mechanism of the tractor.

A more specific object is to provide an implement with a saddle enterable through the rear and comprising a closure member extensible in closed position across the rear of the pocket and in the open position downwardly diagonally rearwardly from the pocket to the ground to provide a ramp for guiding the steering wheel assembly to and fro with respect to the saddle whereby coupling is accomplished merely by driving the front end of the tractor up and on the implement and uncoupling by backing the tractor off the implement.

A still further object is to devise a pocket in such manner as to obtain a wedging action between the sides of the pocket or receptacle and the tires or tires of the steering wheel assembly whereby the wheels and implement are releasably interlocked simply by driving the steering wheels into the pocket.

Another object is to provide novel stabilizing means which connect between the framework of the implement and the steering post to prevent shimmying between the implement and the tractor and perfect the coupling between the wheel and the saddle of the implement.

A still further object is to position the coupling means at one side of the axis of the supporting wheels of the implement and to carry the implement mechanism at the opposite side of the axis in counterbalancing relationship to the tractor front end which is to be carried by the coupling means thereby distributing the weight across the wheels of the implement and facilitating steering thereof.

In one embodiment of the invention the implement wheels are positioned on an axis in alignment with the vertical axis of the steering shaft of the front truck of the tractor.

These and other objects of the invention will become more apparent from the specification and the drawings wherein:

Figure 1 is a side elevational view of a tractor shown in coupled relationship with the implement in accordance with the invention;

Figure 2 is a fragmentary top plan view of Figure 1;

Figure 3 is an enlarged fragmentary transverse sectional view taken substantially on line 3—3 of Figure 2;

Figure 4 is a cross-sectional view of the closure member taken substantially on the line 4—4 of Figure 3;

Figure 5 illustrates a further embodiment of the invention and is a fragmentary side elevational view comparable to Figure 1; and Figure 6 is a transverse vertical sectional view taken substantially on the line 6—6 of Figure 4.

Describing the invention in detail, and referring first to the embodiment shown in Figures 1 through 3, the tractor generally designated 2 may be of conventional design including rear ground engaging traction wheels 4 at the rear end of the body 6, which, at its forward end is supported by means of a conventional steering truck assembly generally designated 8 and including an upright steering shaft or post 10 rotatable on a substantially vertical axis and at its lower end entered between a pair of closely spaced side by side steering wheels 12, 12 which are journaled on a transverse substantially horizontal axis as at 14 to the lower extremity of the steering post 10. Each wheel 12 is provided with a conventional tire 16.

The tractor is shown in association with a wheeled implement, generally designated 18, which may be of any type and herein shown as a combination pickup and windrower which is claimed and described in my related copending application entitled Means and Method for Harvesting and Curing Forage Crops, Serial No. 277,034, filed March 17, 1952. The implement 18 comprises a framework or frame structure generally designated 20 which in the present instance may comprise a pair of channel side beam members 22, 22 which intermediate their ends are connected to a generally horizontal axle 24 which at each end extends outwardly of the beams and journals wheels 26 and 28, respectively, which are preferably independently rotatable on the axle 24 on a common substantially horizontal transverse axis. The forward ends of the side beams 22, 22 are passed under a trough 30 of the implement gatherer mechanism generally designated 32 and may be suitably connected thereto as by welding at 34. The wheel 28 may be provided with a sprocket 36 and the wheel 28 may provide a ground drive through a suitable driving train generally designated 38 for various components of the implement 32. Inasmuch as the implement per se forms no part of the present invention the same will not be further described. It will be seen that the implement mechanism 32 is disposed forwardly of the axis of the supporting wheels of the implement and that the beams 22, 22 extend rearwardly of the axle 24 and carry a saddle member or steering wheel retainer or receiving structure or pocket assembly generally designated 40. The pocket structure may comprise laterally spaced generally upright side walls 42, 42 and a flat bottom wall 44 which may join the side walls along the bottom edges and an arcuate segment 45 joining the forward edges of the walls 42 to define a pocket 46 therewith. The remote or external sides of the walls 42, 42 may be connected preferably as by welding at 48, 48 to the internal sides of the channel beams or members 22, 22 and thus the saddle structure is disposed intermediate the wheels 26 and 28 rearwardly of the axis of rotation thereof. The rear end or extremity of the pocket may be provided with a combination ramp and closure member 50, said closure member being substantially U-shaped in cross section and including a side flange 52 at the lateral margins of a web 54 which is laterally coextensive with the width of pocket 46. The forward extremity of the wall 54 is hinged on a substantially horizontal axis through a pin or hinge connection 56 to the rear end or extremity of the wall 44 whereby the member 50 is accommodated in up and down swinging movements and in the closed position being shown in solid lines in Figure 1 whereat said member 50 extends across the rear end of the pocket. In such position the flanges 52, 52 telescope within the pocket between the rear extremities of the side walls 42, 42 thereof. The rear upper end of the member 50 is provided with a latch which may be in the form of a hook 58 which may journal in an eye 59 and in the closed position of the member 50 may hook into a suitable aperture 60 within the outwardly projecting horizontal flange 62 at the rear end of each beam member 22 as seen in Figure 3. In open position, the member 50 is unlatched and is swung downwardly whereat it extends diagonally downwardly rearwardly and at its far end with respect to the hinge 56 is adapted to bear against the ground. In this position, the latch 58 may be driven into the ground to anchor the implement. In such position the member 50 provides a ramp and the flanges 52, 52 thereof provide lateral guides for guiding the steering wheels to and fro with respect to the pocket.

It will be seen that forwardly of the axle 24, the implement is provided with an adjustable jack 64 adapted to engage the ground in order to position the implement mechanism off the ground when the tractor is disconnected from the implement.

In order to connect the tractor with the implement the flap or member 50 is extended downwardly as shown in phantom lines in Figure 1 and the hook 58 anchored to the ground and the tractor is driven with its steering wheels up the ramp and into the pocket. It will be noted from a consideration of Figure 2 that the side walls of the pocket preferably converge downwardly and are arranged in close embracing relationship with respect to the steering wheels of the tractor whereby a wedging action between these walls and the steering wheels develop and more specifically between these walls and the deformed pneumatic tires of the steering wheels whereby the steering wheels and the saddle member are tightly wedged with each other. This is accomplished merely by driving the steering wheels into the pocket. The walls 42, 42 may also converge forwardly or may be vertical, if desired. The implement and the tractor thus become connected and are steerable as a unit. The member 50 which forms a movable section of the saddle is swung upwardly to close the rear end of the pocket and latch 60 is hooked into the opening 62 to prevent the steering wheels from escaping from the pocket. The member 50 and wall 45 are curved and preferably co-radial with peripheries of wheels 12, 12 for complementary engagement therewith. Inasmuch as the wheels 12, 12 are freely rotatable there may be a tendency for the implement to shimmy with respects to the steering post about the axis 14. In order to stabilize the coupling, a stabilizing means in the form of a bar member 63 extends diagonally downwardly forwardly substantially tangentially to the wheels 12, 12 and at its upper end is connected as by a generally vertical bolt or pin 63' to the steering truck or steering post flange 65 and at its lower end is connected to a cross bar 66 which is connected as by welding to the side beams 22, 22 at an area forwardly of the axle 24.

Referring now to Figures 5 and 6 wherein parts identical with those shown in Figures 1 through 4 are identified with corresponding reference numerals, it will be seen that the construction is generally similar to that shown in Figures 1 through 4 with the exception that the axle 100 of the wheels 26 and 28 has been shifted rearwardly so that it is in generally vertical alignment with the vertical axis of the steering post. The axle 100 is offset at its intermediate extent 102 downwardly beneath the saddle.

It will be readily appreciated that the invention also comprehends an arrangement wherein the implement may be positioned beneath the tractor body and the implement wheels positioned ahead of the implement in alignment with the steering axis or ahead of it. The saddle may also have an entryway from the front or the rear.

What is claimed is:

1. In a coupling arrangement between an implement and a tractor having a steering wheel assembly, said implement comprising a framework having front and rear ends, ground engaging wheel means disposed in supporting relation to said framework intermediate its ends, coupling means mounted on the framework intermediate its ends and formed and arranged to couple with said steering wheel assembly when the same is moved thereonto whereby said framework and steering assembly move as a unit, a crop harvesting unit disposed forwardly of said steering wheel assembly and mounted upon the forward end of said framework, said unit having driven mechanism, and a drive transmission operatively connecting said wheel means and said mechanism, said tractor having a portion of its weight supported from said wheel means and affording traction increase for said wheel means.

2. In a coupling arrangement between a tractor having steering wheel means and a ground supported implement having an ambulant frame, a saddle carried by the frame and providing a pocket adapted to receive wheel means therein, said saddle including a movable section for opening the pocket to provide for egress and ingress of the wheel means with respect to the pocket during uncoupling and coupling respectively, said section being disposable in open position diagonally between the ground and said pocket to provide a ramp for said wheel means to and fro with respect to said pocket, and latch means movably mounted on said section and having a portion formed and arranged to latch with a cooperating portion of the frame in closed position of said section and to be pressed and anchored into the ground in open position of said section to anchor the implement to the ground and thereby prevent the implement from shifting away from the tractor during coupling or uncoupling.

3. In a device of the class described, the combination of a fore and aft extending framework with a supporting wheel and axle assembly including a pair of spaced coaxial wheels disposed intermediate the ends of said framework, said framework comprising a pair of laterally spaced fore and aft extending side beam members, a coupling saddle locating at one end of said framework between said beams, and having a pair of side elements disposed against respective beam members and connected thereto, a bottom element interconnecting said side elements and disposed below the axis of rotation of said wheels, a combination ramp and closure member pivoted to said bottom member and having an open position whereat extending between said saddle and the ground and having a closed position extending between said side elements, an implement carried by said framework at the other end thereof, stabilizing means comprising a cross-member interconnecting said beam members and disposed intermediate said wheels and said implement and a stabilizing member connected to said cross-member and extending diagonally upwardly in a direction toward said one end of said framework.

4. The invention according to claim 3 and a latch connected to said combination closure and ramp member and comprising a hook-like portion pivoted to an edge of said last-mentioned member remote from the pivot of the same to said bottom element and adapted to be pressed into the ground in the open position of said combination member for anchoring the device to the ground, and means on said framework formed and arranged to cooperate with said hook-like portion for holding said combination member in closed position.

References Cited in the file of this patent

UNITED STATES PATENTS

| | | |
|---|---|---|
| 2,436,499 | Williams | Feb. 24, 1948 |
| 2,463,744 | Clemens | Mar. 8, 1949 |
| 2,541,582 | Hawkins | Feb. 13, 1951 |
| 2,551,725 | Christiansen | May 8, 1951 |
| 2,552,804 | Morris | May 15, 1951 |
| 2,556,270 | Groeller | June 12, 1951 |
| 2,661,856 | Stanley et al. | Dec. 8, 1953 |